Figure 1:
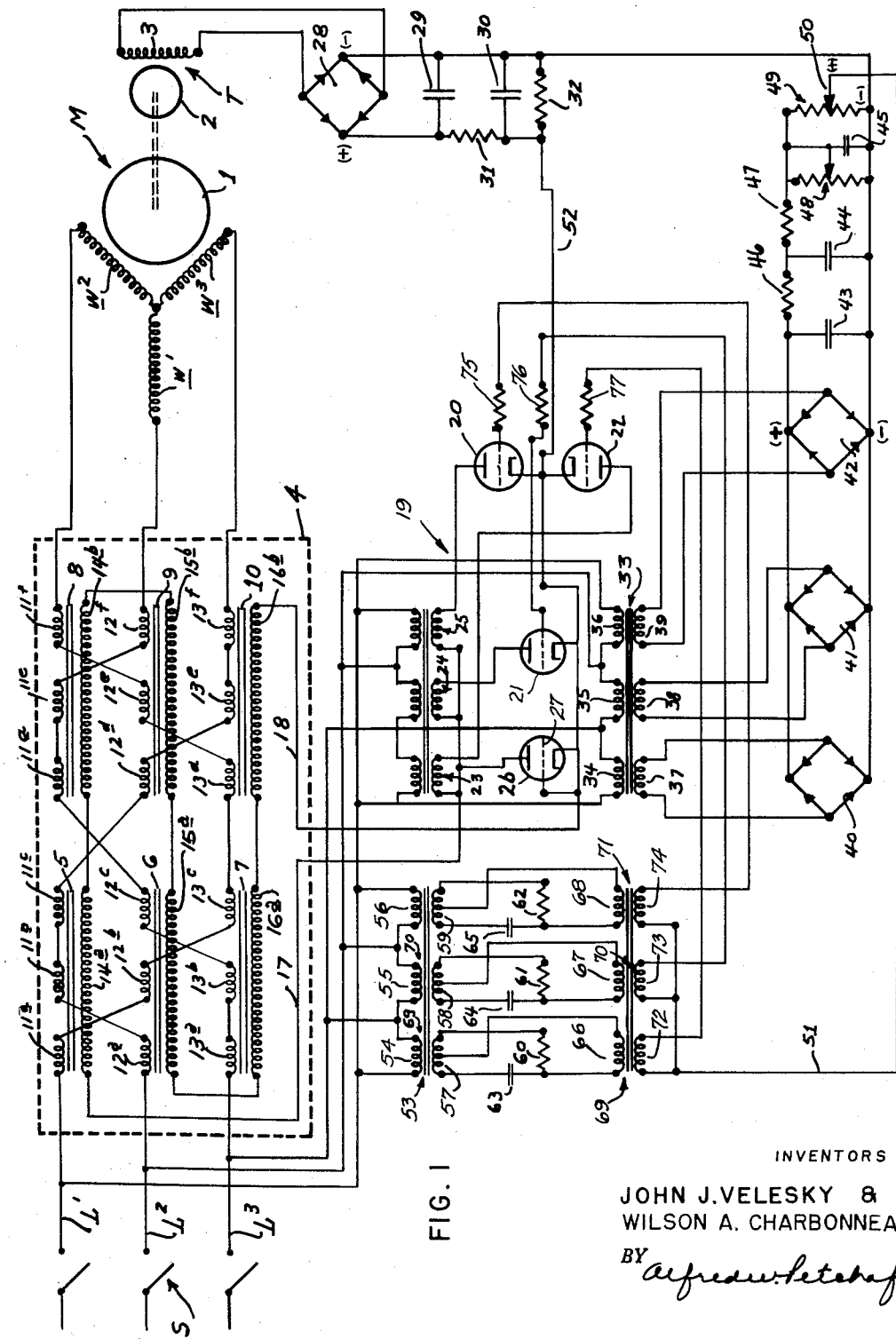

INVENTORS
JOHN J. VELESKY &
WILSON A. CHARBONNEAUX

United States Patent Office 2,901,682
Patented Aug. 25, 1959

2,901,682

CONTROL DEVICES FOR ALTERNATING-CURRENT MOTORS AND THE LIKE

Wilson A. Charbonneaux and John J. Velesky, Dayton, Ohio, assignors to Wac Line, Inc., Dayton, Ohio, a corporation of Ohio Application March 11, 1957, Serial No. 645,128

6 Claims. (Cl. 318—229)

This invention relates to speed controls for electric motors and, more particularly, to control devices for alternating-current motors and the like.

A principal object of the invention is to provide a control device and control system for alternating-current motors of the induction type which will maintain the motor at a preselected speed over a comparatively wide range of torque output of the motor.

Another object of the invention is to provide a control device of the type stated which can also be applied where desired to maintain the motor at substantially constant torque over a wide range of speed.

And another object of the invention is to provide a control device for alternating-current motors of the induction type which is economical in manufacture, efficient in use, and which may be serviced by personnel of limited training and experience.

Broadly speaking, the control device and control system of the present invention includes a multi-pole tachometer generator, the rotating element of which is mechanically connected to the rotating element of a polyphase induction motor. The alternating-current voltage produced by such a generator is a function of its speed and the value of this voltage at any instant is indicative of the speed of the tachometer and, consequently, of the speed of the motor. The alternating voltage is rectified in a suitable rectifier and this rectified voltage is balanced against a suitable reference voltage to obtain a differential voltage, which differential voltage is applied in a suitable control circuit to control the operation of a unique type of polyphase saturable reactor having a load-current waveform which closely approaches the sinusoidal wave form of alternating-current and thereby varying the quantity of electrical energy supplied to the motor in a manner such as to maintain the motor at a preselected speed.

Figure 2:
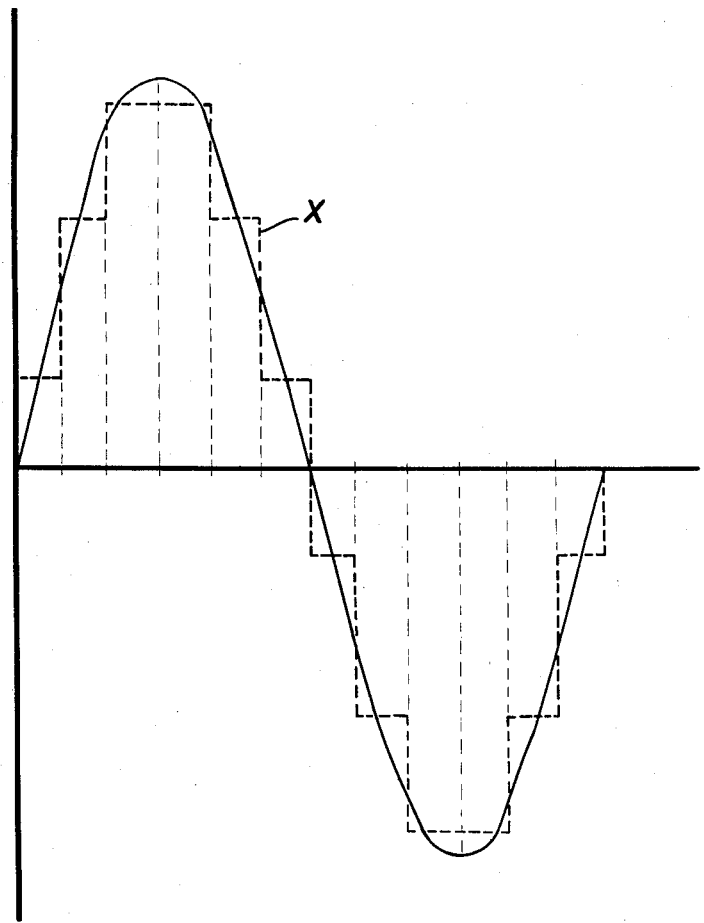

In the drawings, which show a preferred embodiment of the invention, and which forms a part of this specification:

Fig. 1 is a schematic diagram of a control device and control system embodying the invention; and Fig. 2 is a graph showing instantaneous values of current supplied to a motor.

The invention consists of a motor M having windings $W^1$, $W^2$, $W^3$, respectively connected to three phase alternating-current lines $L^1$, $L^2$, $L^3$, having a conventional main switch S. The motor M also operatively includes a conventional rotor 1 which is mechanically connected to the rotor 2 of a tachometer generator T having a winding 3.

Interposed in motor current supply lines $L^1$, $L^2$, $L^3$, is a polyphase saturable reactor 4 which comprises a core fabricated from a magnetic material, such, for example, as laminations of transformer steel, having a plurality of legs 5, 6, 7, 8, 9, 10, which are respectively wound with primary coils or reactor windings $11^a$, $11^b$, $11^c$, $11^d$, $11^e$, $11^f$, $12^a$, $12^b$, $12^c$, $12^d$, $12^e$, $12^f$, $13^a$, $13^b$, $13^c$, $13^d$, $13^e$, $13^f$, said coils being connected in a predetermined configuration as shown in Fig. 1. Also wound upon the legs 5, 6, 7, 8, 9, 10, respectively, are secondary or control coils $14^a$, $14^b$, $15^a$, $15^b$, $16^a$, $16^b$, which are connected in series with each other and with conductors 17, 18, which are, in turn, connected to the control circuit 19 so that the same quantity of control current is supplied to each such coil. The polyphase reactor 4 may, therefore, be thought of as a multiple-section reactor consisting of six reactors which are wound on the legs 5, 6, 7, 8, 9, 10, as shown in Fig. 1. The number of turns on each of the coils $11^a$, $11^b$, $11^c$, $11^d$, $11^e$, $11^f$, $12^a$, $12^b$, $12^c$, $12^d$, $12^e$, $12^f$, $13^a$, $13^b$, $13^c$, $13^d$, $13^e$, $13^f$, $14^a$, $14^b$, $15^a$, $15^b$, $16^a$, $16^b$, and the configuration of their connection is such that, for a given value of control current in coils 14, 15, 16, the load current passed into each phase of motor windings $W^1$, $W^2$, $W^3$, is composed of a number of discrete steps as shown by the stepped curve X of Fig. 2. The proportions and configuration of the coils may be predetermined by those skilled in the art in such a manner that the current steps will have any desired form, but a form which approaches a sinusoidal curve is preferred. By varying the value of control current in coils $14^a$, $14^b$, $15^a$, $15^b$, $16^a$, $16^b$, the height of the stepped curve X may be varied. Thus, the motor M may be supplied with alternating-current, each phase of which has any desired wave form and the value of the current in each phase may be adjusted by varying the control current supplied to coils 14, 15, 16, by control circuit 19.

The mode of operation of the polyphase reactor 4 will be understood by considering that the direct current in the control coils $14^a$, $14^b$, $15^a$, $15^b$, $16^a$, $16^b$, is ripple-free and premagnetizes equally the iron in the legs 5, 6, 7, 8, 9, 10, to a fraction of total saturation with the result that the reactance of the reactor windings permit only a portion of the maximum current to flow in the phases $L^1$, $L^2$, $L^3$. In phase $L^1$, for example, it will be noted that the connection to the motor winding $W^2$ is through the series-connected reactor windings $11^a$, $12^b$, $13^c$, $13^d$, $12^e$, $11^f$. Thus, as current in the phase $L^1$ goes through its cycle, the current in the phases $L^2$, $L^3$, will affect the saturation points of the six reactors differently, depending upon the instantaneous value of each phase current in each reactor. The reactors change from positive to negative saturation in a predetermined sequence, and, likewise return to positive saturation in the same order. Consequently, as the reactor units are successively unsaturated in the predetermined order, the current in each phase is forced to change in discrete steps. The number of steps will correspond to the number of reactors and, if an infinite number of reactors were used, the curve X would be a sine wave.

It will also be apparent that the higher the current in the control coils $14^a$, $14^b$, $15^a$, $15^b$, $16^a$, $16^b$, the greater the saturation of the iron and the lower the line series impedance. The motor windings $W^1$, $W^2$, $W^3$, act as a choke in each circuit to produce approximately sinusoidal flux to the rotor 1, and, therefore, lower the losses which would ordinarily be caused by a single reactor or gaseous discharge impedance devices, such as thyratrons or ignitrons.

The control circuit 19 comprises three gas-filled vacuum tubes 20, 21, 22, such as thyratrons, connected across the secondary windings of transformers 23, 24, 25, the primary winding of each transformer being connected across one phase of the source of electrical energy supplied to reactor 4. The arrangement is such that the three thyratrons 20, 21, 22, form a half-wave rectifier and supply direct-current to control coils $14^a$, $14^b$, $15^a$, $15^b$, $16^a$, $16^b$. A thyratron tube 26, having its grid 27 connected to its cathode, is connected across coils $14^a$, $14^b$, $15^a$, $15^b$, $16^a$, $16^b$, the arrangement being such that a substantially continuous flow of direct-current energy is supplied to coils $14^a$, $14^b$, $15^a$, $15^b$, $16^a$, $16^b$. Furthermore, the tube 26 acts as a rectifying device across the series control coils and is used as a filter to provide ripple-free control current. The use of the tube 26 is preferable to that of a capacitor since the latter would tend to affect the response of the circuit. On the other hand, the tube 26 tends only to prevent inductive surges without storage. A suitable voltage applied to the grids of tubes 20, 21, 22, will cause these tubes to fire over any desired portion of each half-cycle of applied current so that by varying the voltage applied to the grids of these tubes, the quantity of direct-current supplied to coils $14^a$, $14^b$, $15^a$, $15^b$, $16^a$, $16^b$, may be varied. Thus, by causing the voltage applied to the grids of tubes 20, 21, 22, to vary as a function of the voltage generated by tachometer generator T, the quantity of direct current fed to coils $14^a$, $14^b$, $15^a$, $15^b$, $16^a$, $16^b$, will be varied so as to cause the reactor 4 to supply alternating-current to motor M in quantity such that the motor will operate at any preselected speed.

The voltage output of winding 3 of tachometer generator T is fed into a rectifier bridge 28, the output of which is fed into a filter circuit consisting of capacitors 29 and 30 and resistor 31. A resistor 32 is connected across the output of the filter circuit so that the voltage across this resistor is a function of the speed of tachometer generator T.

A transformer 33, having primary coils 34, 35, 36, thereon, is connected with one of each of the primary coils across one phase of the main alternating-current supply. While three separate transformers connected as is well known in the art could be used, a transformer having three coils wound on one core is preferred. The output of each of the three secondary coils 37, 38, 39, is fed into rectifier bridges 40, 41, 42, the combined output of which is fed into a filter circuit consisting of capacitors 43, 44, 45, resistors 46, 47, and potentiometer 48. A second potentiometer 49 is connected across the output of the filter circuit and may be placed in any convenient location remote from both motor M and the above described control apparatus, such, for example, as at the operators' station of a machine driven by motor M. Any desired reference voltage may be preselected by manipulation of the movable arm 50 of potentiometer 49, so that the voltage measured across the conductors 51, 52, is the algebraic sum of the preselected reference voltage and the voltage appearing across resistor 32.

A transformer 53, similar in construction to transformer 33 described above, is provided with primary windings 54, 55, 56, each one of the windings being connected across one phase of the main alternating-current supply. Each secondary winding 57, 58, 59, is connected to a phase-shift circuit consisting of resistors 60, 61, 62, capacitors 63, 64, 65, and the primary coils 66, 67, 68, of transformers 69, 70, 71, which also have secondary windings 72, 73, 74, connected, in turn, to the grids of tubes 20, 21, 22, through grid resistors 75, 76, 77, and to the movable arm 50 of potentiometer 49. The cathodes of tubes 20, 21, 22, are connected to resistor 32. The arrangement is such that an alternating voltage is applied to the grid-to-cathode of each tube 20, 21, 22, and this voltage is displaced in phase from the anode-to-cathode voltage of the respective tube by a suitable amount, such, for example, in the present invention, by substantially sixty electrical degrees. This alternating-current voltage is superimposed upon the direct-current voltage which is the algebraic sum of the preselected reference voltage and tachometer voltage. Thus, when the speed of motor M is decreased, the differential voltage across conductors 51, 52, becomes less negative, so that the tubes 20, 21, 22, are caused to fire over an increased portion of the cycle. Conversely, when the speed of motor M is increased, the differential voltage becomes more negative so that the tubes fire over a decreased portion of the cycle. As described above, variation in the firing of the tubes causes the reactor 4 to supply energy to motor M in amounts sufficient to maintain the speed of the motor at that value corresponding to the positioning of the movable arm 50 of the potentiometer 49.

While the drawings and specification show a preferred embodiment of the invention, it is to be understood that changes can be made in either without departing from the invention as described in the appended claims.

Having thus described our invention, what we claim and desire to secure by Letters Patent is:

1. For use with polyphase alternating-current induction motors and the like; control means comprising reactors interposed in each phase of the motor current-supply, means for producing a stable reference voltage, means for producing a sensory voltage, the value of which varies responsive to the variation in speed of the motor means for combining said reference and sensory voltages whereby to produce a control voltage which is the algebraic sum of the reference and sensory voltages, a control winding for the reactors, said control winding being formed by separate windings for each reactor, said windings being connected in series, first grid-controlled electron tube means for modifying the current in said control windings responsive to variations in said control voltage, and second electron tube means for maintaining a substantially continuous flow of current through said control winding.

2. For use with polyphase alternating-current induction motors and the like; speed control means comprising reactors interposed in each phase of the motor current-supply, a tachometer generator mechanically connected to the motor adapted to generate a tachometer voltage which fluctuates responsive to variation in speed of the motor, a source of stable reference voltage means for imposing said reference voltage upon the tachometer voltage whereby to produce a control voltage which is the algebraic sum of said tachometer and reference voltages, a control winding for the reactors, said control winding being formed by separate windings for each reactor, said windings being series connected, electron tube means for modifying the current in said control winding responsive to variations in said control voltage, and means for maintaining a substantially continuous flow of current through said control winding.

3. For use with polyphase alternating-current induction motors and the like; speed control means comprising reactors interposed in each phase of the motor current-supply, a tachometer generator mechanically connected to the motor adapted to generate a tachometer voltage which fluctuates responsive to variation in speed of the motor, a source of stable reference voltage, means for imposing said reference voltage upon the tachometer voltage whereby to produce a control voltage which is the algebraic sum of said tachometer and reference voltages, a control winding for the reactors, said control winding being formed by separate windings for each reactor, said windings being series connected, first electron tube means for modifying the current in said control winding responsive to variations in said control voltage, and second electron tube means for maintaining a substantially continuous flow of current through said control winding.

4. For use with polyphase alternating-current induction motors and the like; speed control means comprising reactors interposed in each phase of the motor current-supply, a tachometer generator mechanically connected to the motor adapted to generate a tachometer voltage which fluctuates responsive to variation in speed of the motor, a source of stable reference voltage, means for imposing said reference voltage upon the tachometer voltage whereby to produce a control voltage which is the algebraic sum of said tachometer and reference voltages, a control winding for the reactors, said control winding being formed by separate windings for each reactor, said windings being series connected, a control circuit for varying the current in said control winding responsive to variations of said control voltage, said control circuit including a resistance-capacitance phase-shifting network for the reactors, electron tube means associated with the reactors and having a grid means connected to said phase-shifting network, said control voltage being impressed upon the grid means through the phase-shifting network, whereby to cause the tubes to fire for a greater or lesser portion of each current cycle depending upon the instantaneous value of the control voltage, and additional electron tube means for maintaining a substantially continuous flow of current through said control winding.

5. For use with polyphase alternating-current induction motors and the like; control means comprising a polyphase reactor having a plurality of legs, each of said legs having separate windings thereon in the provision of a plurality of reactors, the windings of the respective legs being connected in criss-cross manner and interposed in each phase of the motor current-supply such that the reactors saturate in a predetermined sequence at different instantaneous values of motor current in each phase, means for producing a stable reference voltage, means for producing a sensory voltage, the value of which varies responsive to the variation in speed of the motor, means for combining said reference and sensory voltages whereby to produce a control voltage which is the algebraic sum of the reference and sensory voltages, means for modifying the voltage transmission of said polyphase reactor, and means for modifying the current in said last-mentioned means responsive to variations in said control voltage.

6. For use with polyphase alternating-current induction motors and the like; control means comprising a polyphase reactor having a plurality of legs, each of said legs having separate windings thereon in the provision of a plurality of reactors, each winding of the respective legs being connected in series with a winding on a different leg and interposed in each phase of the motor current-supply whereby to set up a criss-cross phase-jumping magnetic circuit such that the reactors saturate in a predetermined sequence at different instantaneous values of motor current in each phase, means for producing a stable reference voltage, means for producing a sensory voltage, the value of which varies responsive to the variation in speed of the motor means for combining said reference and sensory voltages whereby to produce a control voltage which is the algebraic sum of the reference and sensory voltages, means for modifying the voltage transmission of said polyphase reactor, and means for modifying the current in said last-mentioned means responsive to variations in said control voltage.

References Cited in the file of this patent
UNITED STATES PATENTS
2,676,292     Spencer _____ Apr. 20, 1954